United States Patent
Crane

(10) Patent No.: US 10,458,690 B2
(45) Date of Patent: Oct. 29, 2019

(54) CONTROL SYSTEM

(71) Applicant: JOHNSON CONTROLS TECHNOLOGY COMPANY, Holland, MI (US)

(72) Inventor: Curtis Christian Crane, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 284 days.

(21) Appl. No.: 14/389,488

(22) PCT Filed: Apr. 26, 2013

(86) PCT No.: PCT/US2013/038389
§ 371 (c)(1),
(2) Date: Sep. 30, 2014

(87) PCT Pub. No.: WO2013/165841
PCT Pub. Date: Nov. 7, 2013

(65) Prior Publication Data
US 2015/0056059 A1   Feb. 26, 2015

Related U.S. Application Data

(60) Provisional application No. 61/640,308, filed on Apr. 30, 2012.

(51) Int. Cl.
*F25B 49/02* (2006.01)
*F25B 1/053* (2006.01)
(Continued)

(52) U.S. Cl.
CPC .......... *F25B 49/022* (2013.01); *F04D 27/002* (2013.01); *F04D 27/004* (2013.01); *F25B 1/053* (2013.01); *F25B 49/025* (2013.01); *F25B 1/10* (2013.01); *F25B 9/008* (2013.01); *F25B 25/005* (2013.01); *F25B 2339/047* (2013.01); *F25B 2500/19* (2013.01); *F25B 2600/021* (2013.01);
(Continued)

(58) Field of Classification Search
CPC .... F04D 27/002; F04D 27/004; F25B 49/022; F25B 2700/21155; F25B 1/10; F25B 2600/021
See application file for complete search history.

(56) References Cited

U.S. PATENT DOCUMENTS 4,608,833 A * 9/1986 Kountz ............... F04D 27/0284
62/201
5,355,691 A * 10/1994 Sullivan .............. F04D 27/0261
415/17
(Continued)

FOREIGN PATENT DOCUMENTS

| CN | 1629495 A | 6/2005 |
|---|---|---|
| WO | 2007102889 A2 | 9/2007 |
| WO | 2009012310 A1 | 1/2009 |

*Primary Examiner* — Larry L Furdge
(74) *Attorney, Agent, or Firm* — Fletcher Yoder, P.C.

(57) ABSTRACT

A control system controls the output capacity of a compressor to avoid surge conditions in the compressor. The control system determines a capacity control output for the compressor and then modifies the capacity control output in view of any output limiters or overrides as determined by system operating parameters and to maintain a minimum frequency of operation for the compressor.

17 Claims, 8 Drawing Sheets

(51) Int. Cl.
*F04D 27/00* (2006.01)
*F25B 1/10* (2006.01)
*F25B 9/00* (2006.01)
*F25B 25/00* (2006.01)

(52) U.S. Cl.
CPC ... *F25B 2600/0261* (2013.01); *F25B 2600/17* (2013.01); *F25B 2600/21* (2013.01); *F25B 2700/151* (2013.01); *F25B 2700/195* (2013.01); *F25B 2700/197* (2013.01); *F25B 2700/21152* (2013.01); *F25B 2700/21155* (2013.01); *F25B 2700/21173* (2013.01); *Y02B 30/741* (2013.01)

(56) References Cited

U.S. PATENT DOCUMENTS

| | | | | |
|---|---|---|---|---|
| 5,477,696 | A | * 12/1995 | Takahata | F25B 49/043 62/141 |
| 6,139,262 | A | * 10/2000 | Ravidranath | F04D 29/464 415/126 |
| 2005/0144965 | A1 | 7/2005 | Ueda et al. | |
| 2008/0253877 | A1 | * 10/2008 | Bodell | F04D 27/0207 415/13 |
| 2009/0217679 | A1 | 9/2009 | Raghavachari | |
| 2011/0048046 | A1 | * 3/2011 | Sommer | F04D 17/12 62/228.1 |

* cited by examiner

CONTROL SYSTEM

CROSS-REFERENCE TO RELATED APPLICATIONS

This application claims the benefit of U.S. Provisional Application No. 61/640,308, filed Apr. 30, 2012, entitled CONTROL SYSTEM, which Application is incorporated by reference herein in its entirety.

BACKGROUND

The application generally relates to a control system for a compressor. The application relates more specifically to a capacity control system for a centrifugal compressor.

One method to control capacity in a centrifugal compressor is by adjusting the position of pre-rotation vanes (PRVs) or inlet guide vanes located at the inlet to the centrifugal compressor to control the flow of refrigerant or other fluid into the compressor. An actuator can be used to open the PRVs to increase the amount of refrigerant or fluid to the compressor and thereby increase the capacity of the system. Similarly, the actuator can be used to close the PRVs to decrease the amount of refrigerant or fluid to the compressor and thereby decrease the capacity of the system. Other methods that can be used to control capacity in a centrifugal compressor include adjusting the speed of the compressor with a variable speed drive or opening a hot gas bypass valve to direct a portion of the compressed refrigerant or fluid back to the suction inlet of the compressor. Each of these capacity control methods provides advantages and limitations.

A centrifugal compressor may encounter instabilities such as surge or stall during operation. Surge or surging is a transient phenomenon having oscillations in pressures and flow, and can result in complete flow reversal through the compressor. Surging, if uncontrolled, can cause excessive vibrations in both the rotating and stationary components of the compressor, and may result in permanent compressor damage. One technique to correct a surge condition can involve the opening of a hot gas bypass valve to return some of the discharge gas of the compressor to the compressor inlet to increase the flow at the compressor inlet. In contrast, stall or rotating stall is a local flow separation in one or more components of a compressor, and can have discharge pressure disturbances at fundamental frequencies less than the rotational frequency of the impeller of the compressor. Rotating stall in a fixed speed centrifugal compressor is predominantly located in the diffuser of the compressor and can be remediated with a variable geometry diffuser (VGD). The presence of rotating stall in the compressor can be a precursor of an impending surge condition.

One method for detecting and controlling rotating stall in a diffuser region of a centrifugal compressor includes using a pressure transducer placed in the compressor discharge passageway or the diffuser to measure the prevalent sound or acoustic pressure. The signal from the pressure transducer is filtered and processed via analog or digital techniques to determine the presence or likelihood of rotating stall. Rotating stall is detected by comparing a calculated energy amount from measured discharge pressure pulses or pulsations with a predetermined threshold amount corresponding to the presence of rotating stall.

However, for a portion of the operating range of a centrifugal compressor, the compressor can surge without the occurrence of a prior stall condition, especially when the compressor is operating at low speeds. When the compressor directly enters a surge condition, the control system for the compressor does not have an opportunity to sense for the precursor stall condition. Consequently, the control system of the compressor cannot initiate a corrective action for the stall condition to possibly avoid the onset of the surge condition. Other aspects of the control system for dealing with surge conditions in the compressor require that the control system identify a surge condition(s) and react in a predetermined sequence. For the control system to identify a surge condition, one or more surge cycles must occur during a predetermined length of time before the control system can take corrective action.

In many control systems, the capacity control function and the surge/stall control function or other control functions may be in conflict with each other. For example, the capacity control function may prescribe compressor operating conditions that can cause a surge or stall condition to occur. Similarly, the surge/stall control function may not provide the desired output capacity required by the capacity control function. In addition, other safety or operational parameters can further conflict with the capacity control function.

Therefore, what is needed is a system and method for controlling the capacity of a centrifugal compressor while maintaining stable operating conditions for the compressor.

SUMMARY

The present invention is directed to a method of controlling capacity in a compressor. The method includes calculating an output capacity parameter with a control program, measuring at least one system operating parameter and comparing the at least one measured system operating parameter to corresponding predetermined threshold values for the system operating parameter to determine whether the at least one measured system operating parameter is within a limiting region or an override region corresponding to the at least one measured system operating parameter. The method also includes adjusting the output capacity parameter in response to a determination that the at least one measured system operating parameter is within the limiting region or the override region, calculating a minimum variable speed drive frequency for the compressor to avoid surge conditions and comparing the calculated minimum variable speed drive frequency to a variable speed drive frequency based on the output capacity parameter. The method further includes modifying the output capacity parameter in response to the minimum variable speed drive frequency being greater than the variable speed drive frequency based on the output capacity parameter and applying the output capacity parameter to the compressor to adjust the output capacity of the compressor.

The present invention is further directed to system having a compressor, a condenser, an expansion device and an evaporator connected in a closed refrigerant circuit. The system also has a motor connected to the compressor to power the compressor and a variable speed drive connected to the motor to power the motor. The variable speed drive is operable to provide a variable voltage to the motor and a variable frequency to the motor. The system has a control panel to control operation of the variable speed drive and one or more components of the system. The control panel includes a microprocessor and a memory device. The system has a sensor to measure an operational parameter of the system. The sensor is in communication with the control panel to provide the measured operational parameter. The control panel is operable to execute a control algorithm to determine and apply an output capacity adjustment to the compressor. The output capacity adjustment is an output capacity parameter from a capacity control program modified by an output limiter or override determined from the measured operational parameter of the system and to maintain a minimum variable speed drive frequency to avoid surge conditions.

In one exemplary embodiment of the present application, a centrifugal compressor includes an impeller, a variable geometry diffuser in fluid communication with an output of the impeller and a motor connected to the impeller by a shaft. The centrifugal compressor also includes a sensor and a control panel to control operation of the motor and the variable geometry diffuser. The control panel is configured to receive a signal from the sensor corresponding to the measured operational parameter and is configured to calculate the required output capacity for the compressor.

Other features and advantages of the present application will be apparent from the following more detailed description of the preferred embodiment(s), taken in conjunction with the accompanying drawings, which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE EXEMPLARY EMBODIMENTS

Figure 1:
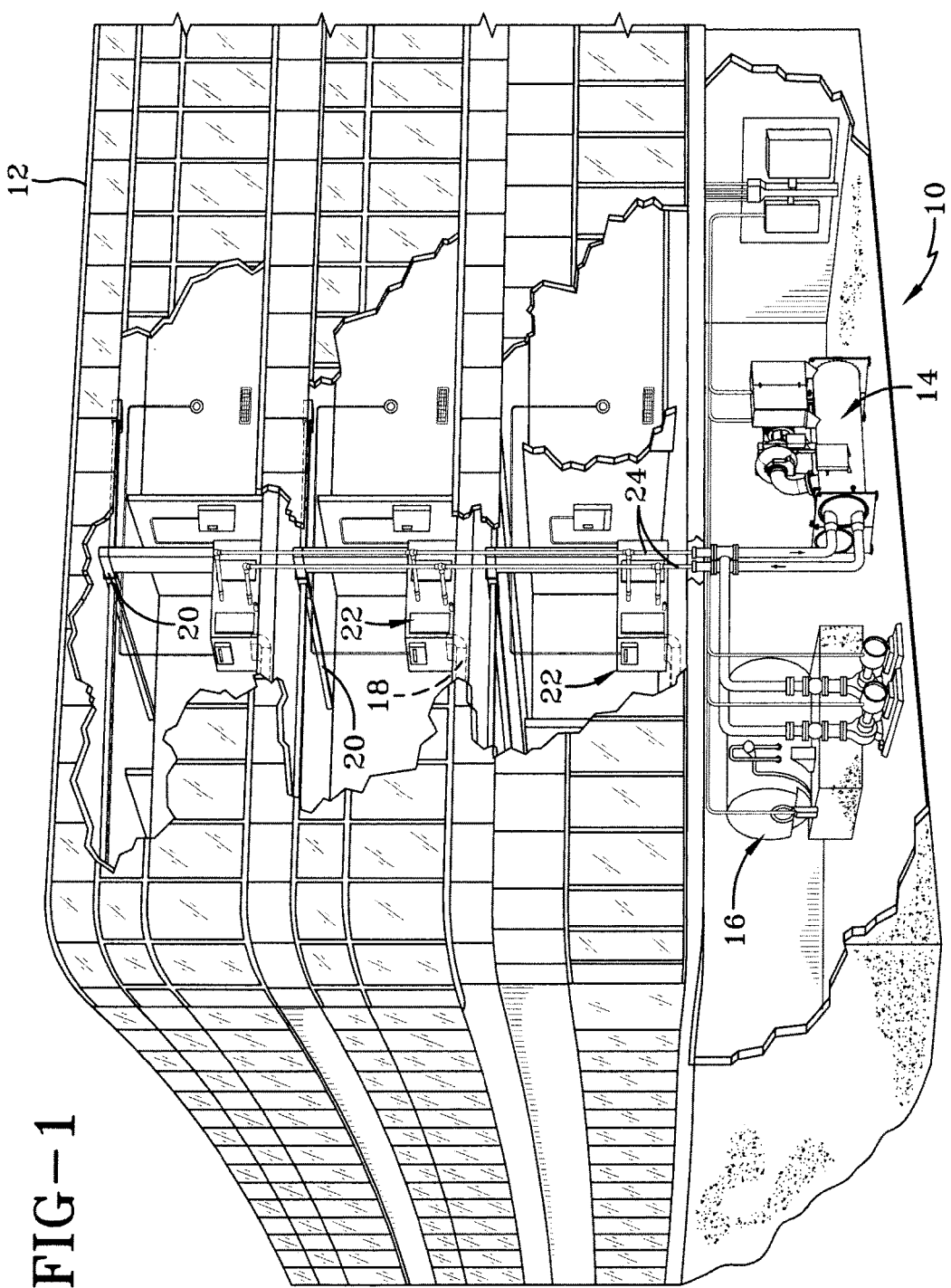
FIG. 1 shows an exemplary embodiment for a heating, ventilation and air conditioning system.

FIG. 1 shows an exemplary environment for a heating, ventilation and air conditioning (HVAC) system 10 in a building 12 for a typical commercial setting. System 10 can include a vapor compression system 14 that can supply a chilled liquid which may be used to cool building 12. System 10 can include a boiler 16 to supply a heated liquid that may be used to heat building 12, and an air distribution system which circulates air through building 12. The air distribution system can include an air return duct 18, an air supply duct 20 and an air handler 22. Air handler 22 can include a heat exchanger that is connected to boiler 16 and vapor compression system 14 by conduits 24. The heat exchanger in air handler 22 may receive either heated liquid from boiler 16 or chilled liquid from vapor compression system 14, depending on the mode of operation of system 10. System 10 is shown with a separate air handler on each floor of building 12, but it is appreciated that the components may be shared between or among floors.

Figure 2:
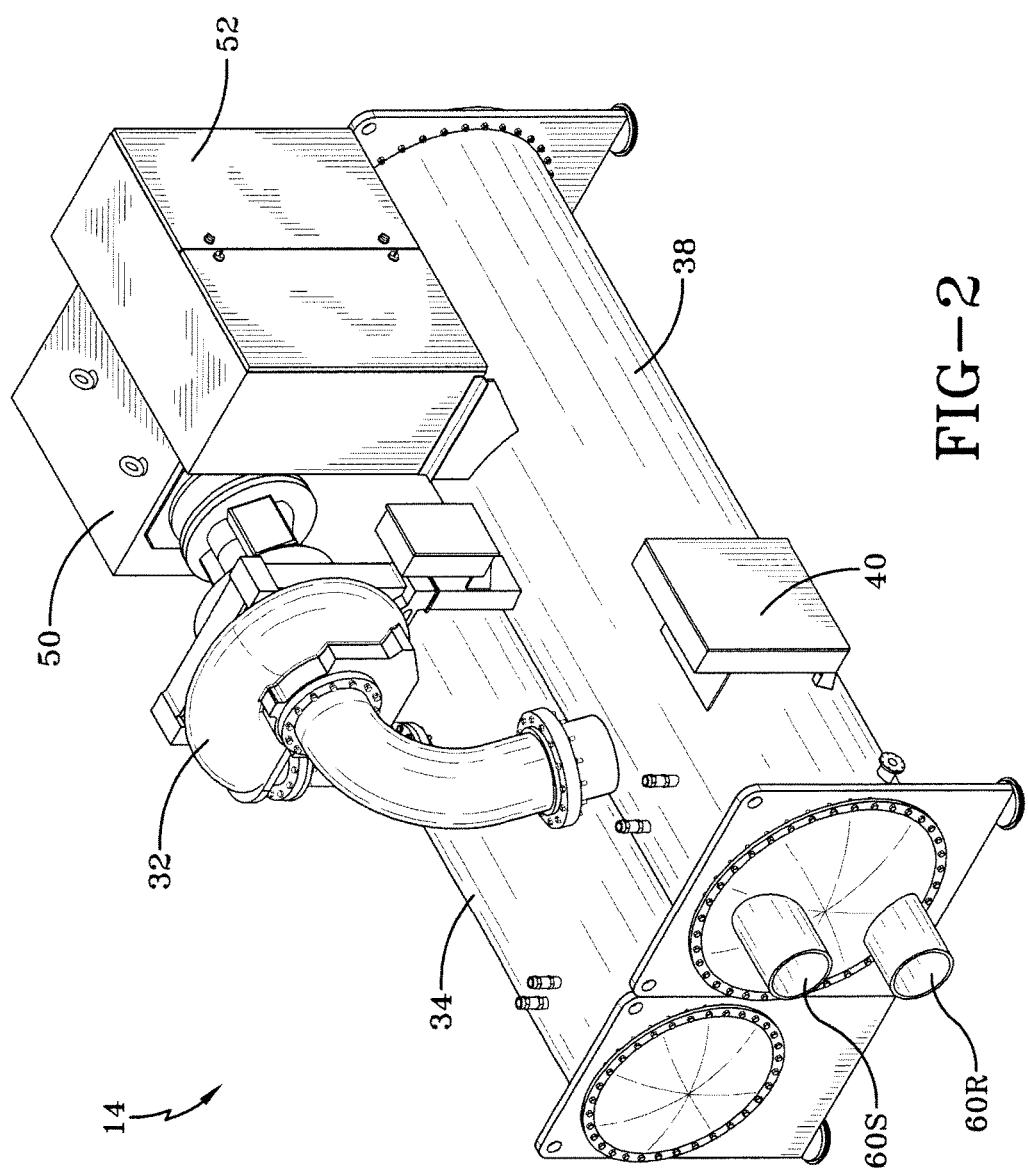
FIG. 2 shows an isometric view of an exemplary vapor compression system.
Figure 3:
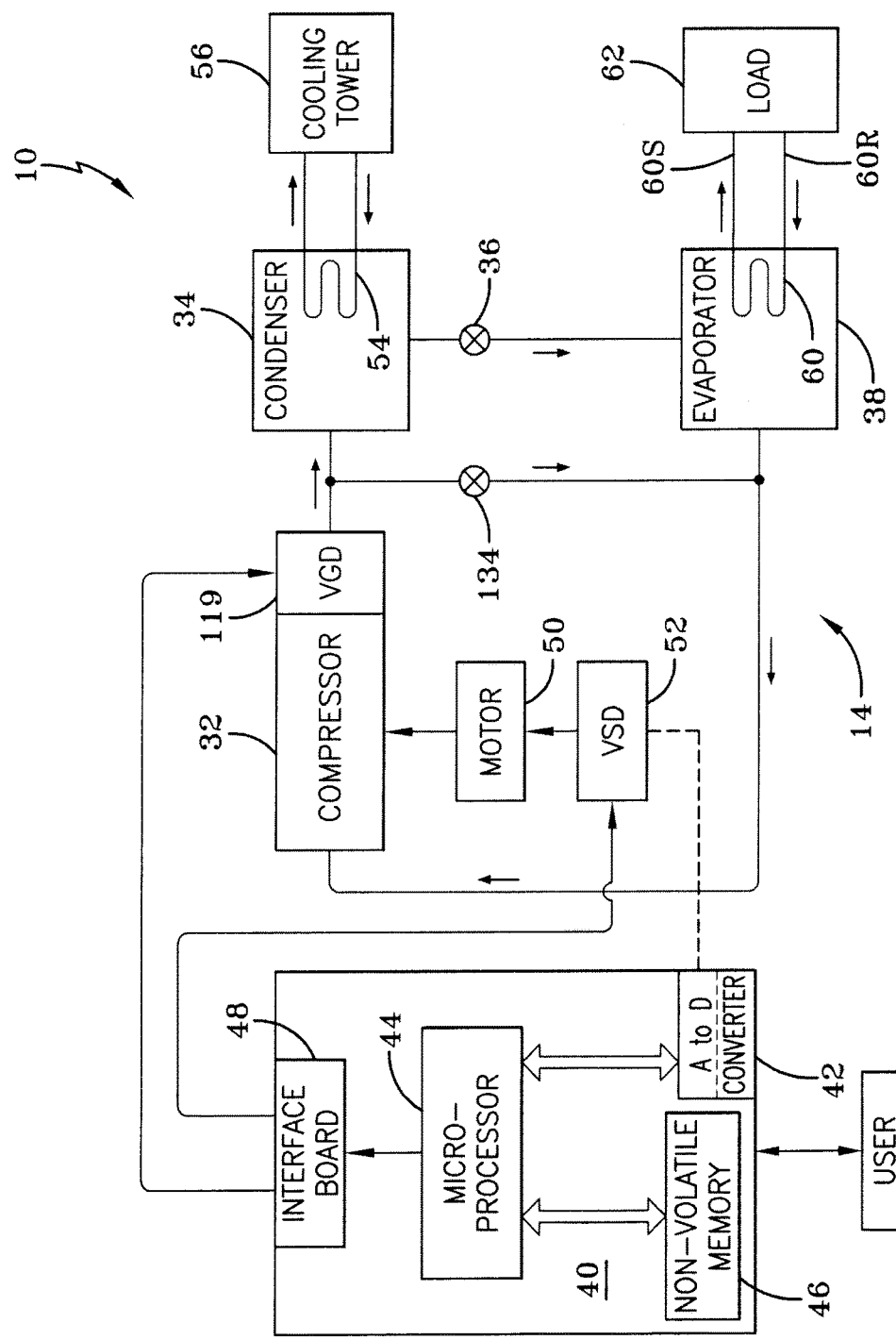
FIG. 3 shows schematically an exemplary embodiment for a heating, ventilation and air conditioning system.
Figure 4:
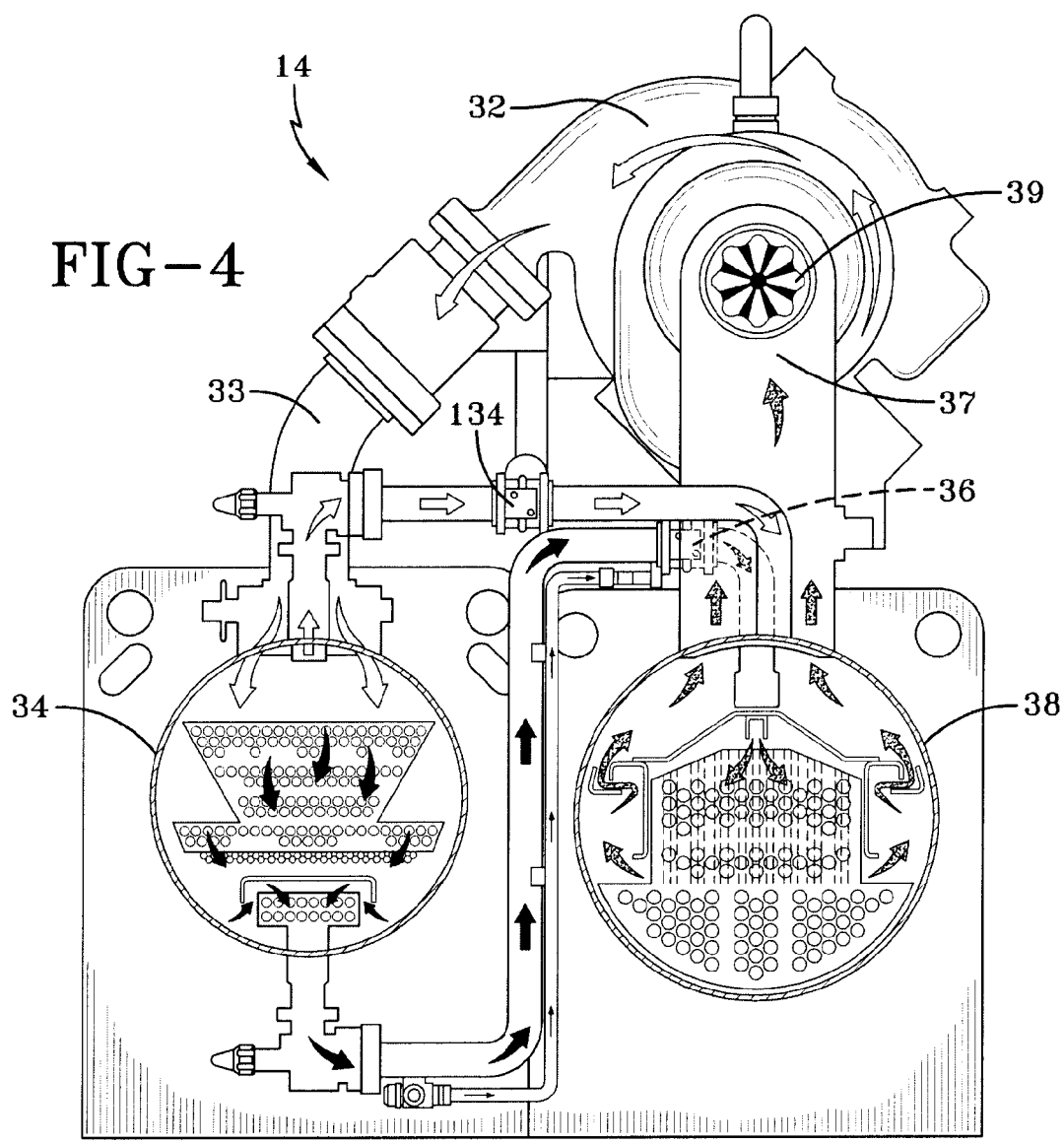
FIG. 4 shows an exemplary embodiment of a vapor compression system.

FIGS. 2-4 show an exemplary vapor compression system 14 that can be used in HVAC system 10. Vapor compression system 14 can circulate a refrigerant through a circuit starting with compressor 32 and including a condenser 34, expansion valve(s) or device(s) 36, and an evaporator or liquid chiller 38. Vapor compression system 14 can also include a control panel 40 that can include an analog to digital (A/D) converter 42, a microprocessor 44, a non-volatile memory 46, and an interface board 48. Some examples of fluids that may be used as refrigerants in vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor or any other suitable type of refrigerant.

Motor 50 used with compressor 32 can be powered by a variable speed drive (VSD) 52 or can be powered directly from an alternating current (AC) or direct current (DC) power source. Motor 50 can include any type of electric motor that can be powered by a VSD or directly from an AC or DC power source. Motor 50 can be any suitable motor type, for example, a switched reluctance motor, an induction motor, or an electronically commutated permanent magnet motor.

Figure 5:
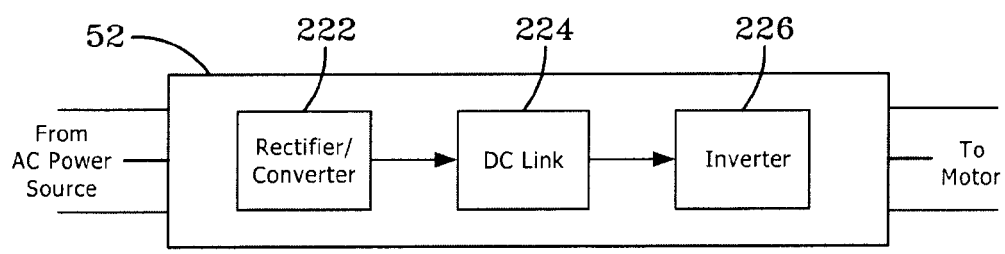
FIG. 5 shows schematically an exemplary embodiment of a variable speed drive.

FIG. 5 shows an exemplary embodiment of a VSD. VSD 52 receives AC power having a particular fixed line voltage and fixed line frequency from an AC power source and provides AC power to motor 50 at a desired voltage and desired frequency, both of which can be varied to satisfy particular requirements. VSD 52 can have three components: a rectifier/converter 222, a DC link 224 and an inverter 226. The rectifier/converter 222 converts the fixed frequency, fixed magnitude AC voltage from the AC power source into DC voltage. The DC link 224 filters the DC power from the converter 222 and provides energy storage components such as capacitors and/or inductors. Finally, inverter 226 converts the DC voltage from DC link 224 into variable frequency, variable magnitude AC voltage for motor 50.

In an exemplary embodiment, the rectifier/converter 222 may be a three-phase pulse width modulated boost rectifier having insulated gate bipolar transistors to provide a boosted DC voltage to the DC link 224 to obtain a maximum RMS output voltage from VSD 52 greater than the input voltage to VSD 52. Alternately, the converter 222 may be a passive diode or thyristor rectifier without voltage-boosting capability.

VSD 52 can provide a variable magnitude output voltage and variable frequency to motor 50 to permit effective operation of motor 50 in response to particular load conditions. Control panel 40 can provide control signals to VSD 52 to operate the VSD 52 and motor 50 at appropriate operational settings for the particular sensor readings received by control panel 40. For example, control panel 40 can provide control signals to VSD 52 to adjust the output voltage and output frequency provided by VSD 52 in response to changing conditions in vapor compression system 14, i.e., control panel 40 can provide instructions to increase or decrease the output voltage and output frequency provided by VSD 52 in response to increasing or decreasing load conditions on compressor 32.

Referring back to FIGS. 2-4, compressor 32 compresses a refrigerant vapor and delivers the vapor to condenser 34 through a discharge passage 33. In one exemplary embodiment, compressor 32 can be a centrifugal compressor having one or more compression stages. The refrigerant vapor delivered by compressor 32 to condenser 34 transfers heat to a fluid, for example, water or air. The refrigerant vapor condenses to a refrigerant liquid in condenser 34 as a result of the heat transfer with the fluid. The liquid refrigerant from condenser 34 flows through expansion device 36 to evaporator 38. A hot gas bypass valve (HGBV) 134 may be connected in a separate line extending from compressor discharge to compressor suction. In the exemplary embodiment shown in FIG. 3, condenser 34 is water cooled and includes a tube bundle 54 connected to a cooling tower 56.

The liquid refrigerant delivered to evaporator 38 absorbs heat from another fluid, which may or may not be the same type of fluid used for condenser 34, and undergoes a phase change to a refrigerant vapor. In the exemplary embodiment shown in FIG. 3, evaporator 38 includes a tube bundle 60 having a supply line 60S and a return line 60R connected to a cooling load 62. A process fluid, for example, water, ethylene glycol, calcium chloride brine, sodium chloride brine, or any other suitable liquid, enters evaporator 38 via return line 60R and exits evaporator 38 via supply line 60S. Evaporator 38 lowers the temperature of the process fluid in the tubes. The tube bundle 60 in evaporator 38 can include a plurality of tubes and a plurality of tube bundles. The vapor refrigerant exits evaporator 38 and returns to compressor 32 by a suction line 37 to complete the circuit or cycle. In the exemplary embodiment shown in FIG. 4, compressor 32 may include pre-rotation vanes 39. The pre-rotation vanes 39 may be fixed into a predetermined position or may have a position that is adjustable. In an exemplary embodiment, vapor compression system 14 may use one or more of each of variable speed drive (VSD) 52, motor 50, compressor 32, condenser 34, expansion valve 36 and/or evaporator 38 in one or more refrigerant circuits.

Figure 6:
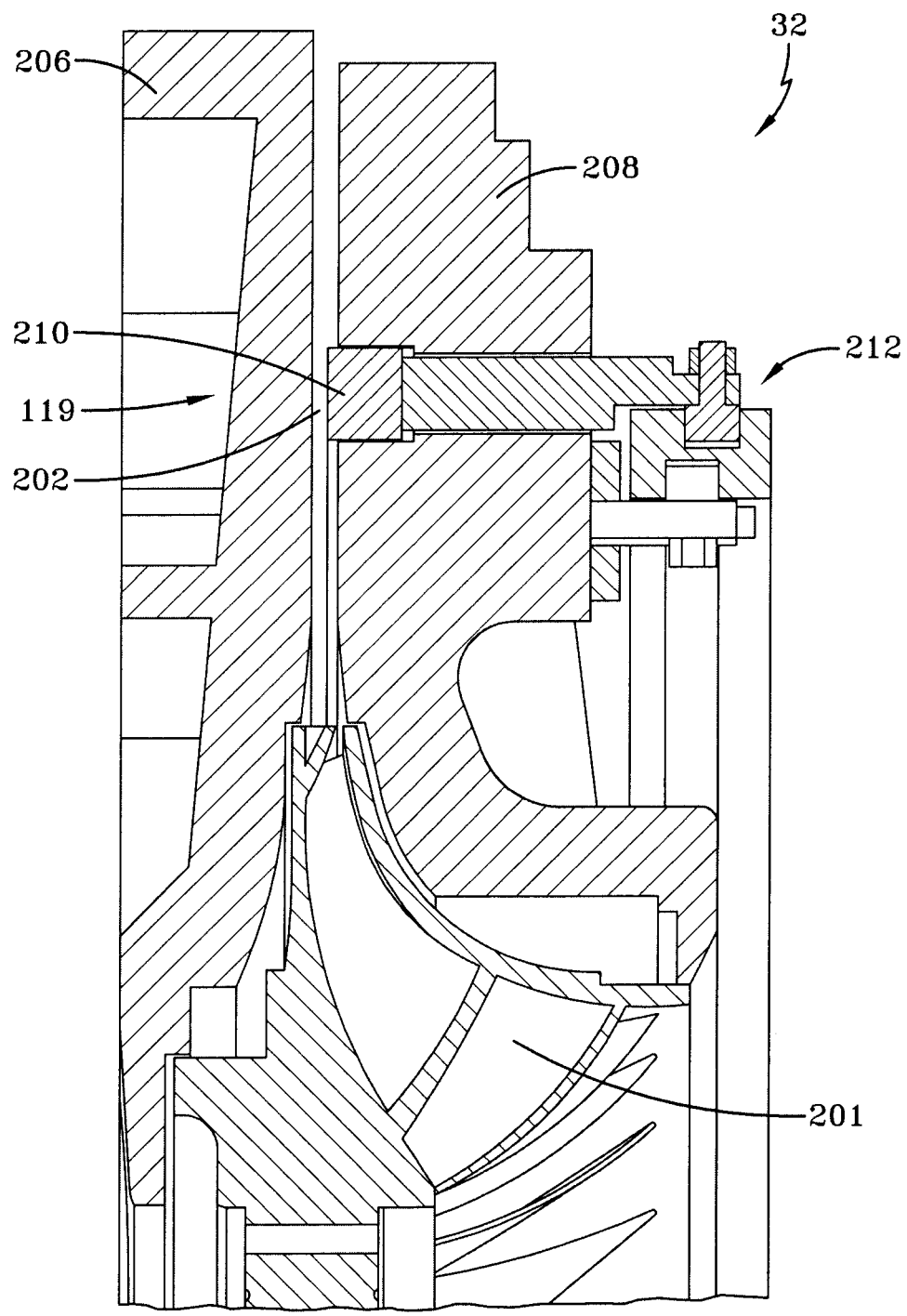
FIG. 6 shows a partial cross-sectional view of an exemplary embodiment of a variable geometry diffuser in a compressor.

FIG. 6 illustrates a partial cross-sectional view of an exemplary embodiment of compressor 32. Compressor 32 includes an impeller 201 for compressing the refrigerant vapor. The compressed vapor from impeller 201 then passes through a variable geometry diffuser (VGD) 119. VGD 119 has a diffuser space or gap 202 formed between a diffuser plate 206 and a nozzle base plate 208 for the passage of the refrigerant vapor. Nozzle base plate 208 is configured for use with a diffuser ring 210. Diffuser ring 210 is used to control the velocity of refrigerant vapor that passes through diffuser space or gap 202. Diffuser ring 210 can be extended into diffuser gap 202 to increase the velocity of the vapor flowing through diffuser gap 202 and can be retracted from diffuser gap 202 to decrease the velocity of the vapor flowing through diffuser gap 202. Diffuser ring 210 can be extended into and retracted from diffuser gap 202 using an adjustment mechanism 212, driven by an actuator.

VGD 119 can be positionable to any position between a substantially open or retracted position, wherein refrigerant flow is substantially unimpeded in diffuser gap 202, and a substantially closed or extended position, wherein refrigerant flow in diffuser gap 202 is restricted. In one exemplary embodiment, VGD 119, when in the closed position, may not completely stop the flow of refrigerant in diffuser gap 202. Adjustment mechanism 212 can move the diffuser ring 210 either continuously, or incrementally in discrete steps to open and close the diffuser gap 202. A more detailed description of the operation and components of one type of VGD is provided in U.S. Pat. No. 6,872,050 issued Mar. 29, 2005, entitled "Variable Geometry Diffuser Mechanism", which patent is hereby incorporated by reference.

In one exemplary embodiment, if compressor 32 has more than one compression stage, VGD 119 may be incorporated in the discharge passage of one or more of the compression stages. In another exemplary embodiment, more than one VGD 119 may be positioned in diffuser gap 202 to control the flow of refrigerant from the impeller 201, and thereby control the capacity of compressor 32. In a further exemplary embodiment, the positioning of diffuser ring 210 can decrease or eliminate surge conditions and stall conditions in compressor 32.

Control panel 40 can include a digital to analog (D/A) converter in addition to A/D converter 42. Further, control panel 40 can be connected to or incorporate a user interface 194 that permits an operator to interact with control panel 40. The operator can select and enter commands for control panel 40 through user interface 194. In addition, user interface 194 can display messages and information from control panel 40 regarding the operational status of vapor compression system 14. The user interface 194 can be located locally to control panel 40, such as being mounted on vapor compression system 14 or control panel 40, or alternatively, user interface 194 can be located remotely from control panel 40, such as being located in a separate control room apart from vapor compression system 14.

In control panel 40, A/D converter 42 and/or interface board 48 may receive input signals from system sensors and components that provide operational parameters for vapor compression system 14. For example, the input signals received by control panel 40 can include the temperature of the leaving chilled liquid temperature from tube bundle 60, refrigerant pressures in evaporator 38 and condenser 34, the input current to the VSD, the output current from the VSD, a compressor discharge temperature, a compressor oil temperature, a compressor oil supply pressure, a VGD position, an HGBV position and an acoustic or sound pressure in the compressor discharge passage. Control panel 40 can use interface board 48 to transmit signals to components of the vapor compression system 14 to control the operation of vapor compression system 14 and to communicate with various sensors and control devices of vapor compression system 14.

Control panel 40 may execute or use a single or central control algorithm or control system to control the operation of vapor compression system 14 including compressor 32, VSD 52, VGD 119, HGBV 134, condenser 34 and the other components of vapor compression system 14. In one embodiment, the control algorithm(s) can be computer programs or software stored in non-volatile memory 46 having a series of instructions executable by microprocessor 44. While the control algorithm can be embodied in a computer program(s) and executed by microprocessor 44, it will be understood by those skilled in the art that the control algorithm may be implemented and executed using digital and/or analog hardware. If hardware is used to execute the control algorithm, the corresponding configuration of control panel 40 can be changed to incorporate the necessary components and to remove any components that may no longer be required. In still another embodiment, control panel 40 may incorporate multiple controllers, each performing a discrete function, with a central controller that determines the outputs of control panel 40.

The central control algorithm executed by microprocessor 44 on the control panel 40 can include a capacity control program or algorithm to control the capacity of the compressor 32 to satisfy a cooling load. The capacity control program can send or transmit control signals to adjust the capacity of the compressor 32 by adjusting the position of the VGD 119, the speed of VSD 52 (and thereby the speed of the motor 50), and the position of the HGBV 134 (if equipped) in a specific sequence depending on whether loading or unloading of the compressor is required to keep a Leaving Chilled Liquid Temperature (LCHLT) at a preselected setpoint. VSD and motor speed can be additionally and simultaneously adjusted as necessary to maintain the minimum compressor lift required to prevent surge as a function of existing compressor speed, VGD position and condenser to evaporator pressure difference. The capacity control program can be used with a compressor that has fixed, i.e., immovable, pre-rotation vanes at the inlet to the compressor. In one embodiment, the fixed pre-rotation vanes can be positioned in a fully open position.

In addition, the capacity control program can include limit and override thresholds for high condenser pressure, low evaporator pressure, high motor current, and high input current to mitigate possible unstable conditions to keep the system operational, e.g., avoid a system shut down. The limits and overrides can limit or reduce the output to the appropriate devices (HGBV, VGD, or VSD) to mitigate the condition and keep the system operational. As any of the limit and override thresholds are approached, the capacity control program can proportionally limit the amount of capacity increase permitted and if exceeded, can issue unloading instructions.

Figure 7:
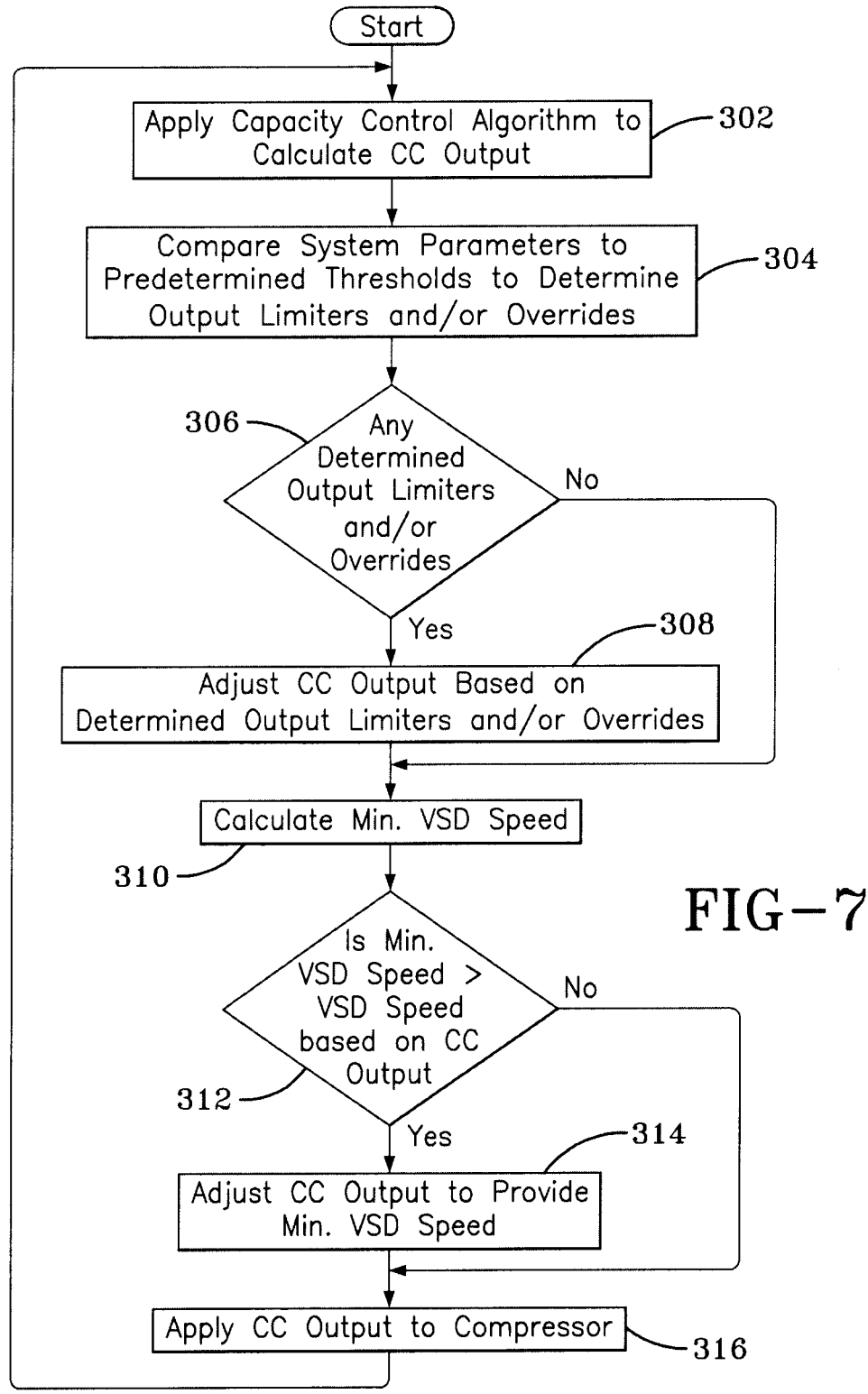
FIG. 7 shows an exemplary embodiment of a capacity control process.

FIG. 7 shows an exemplary embodiment of a capacity control process. The process begins by initiating or applying a capacity control algorithm to determine a capacity control output (CC Output) parameter (step 302). In one exemplary embodiment, the capacity control algorithm can apply or initiate a leaving chilled liquid temperature (LCHLT) Proportional, Integral, Derivative (PID) controller or control algorithm immediately upon entering the run state, i.e., at the start of the compressor. During each control cycle, the capacity control algorithm uses PID logic to determine a desired percent change to system capacity, i.e., the CC Output, based on the LCHLT compared to the LCHLT active setpoint. The desired percent change can be positive for loading or negative for unloading.

The LCHLT active setpoint is a target to the LCHLT programmed setpoint, depending on the control source selected, e.g., a local user interface, a remote user interface or a building automation system (BAS) or ISN control. When the system is not operating, the LCHLT active setpoint is set to the Entering Chilled Liquid Temperature−10° F., with a minimum value of the LCHLT programmed setpoint. When the VSD starts, the LCHLT active setpoint is ramped to the LCHLT programmed setpoint at the programmable LCHLT setpoint ramp rate. When the capacity control program is operating, any change to the programmed LCHLT setpoint results in a ramp from the old active setpoint value to the new LCHLT setpoint value at the programmed LCHLT setpoint ramp rate.

Figure 8:
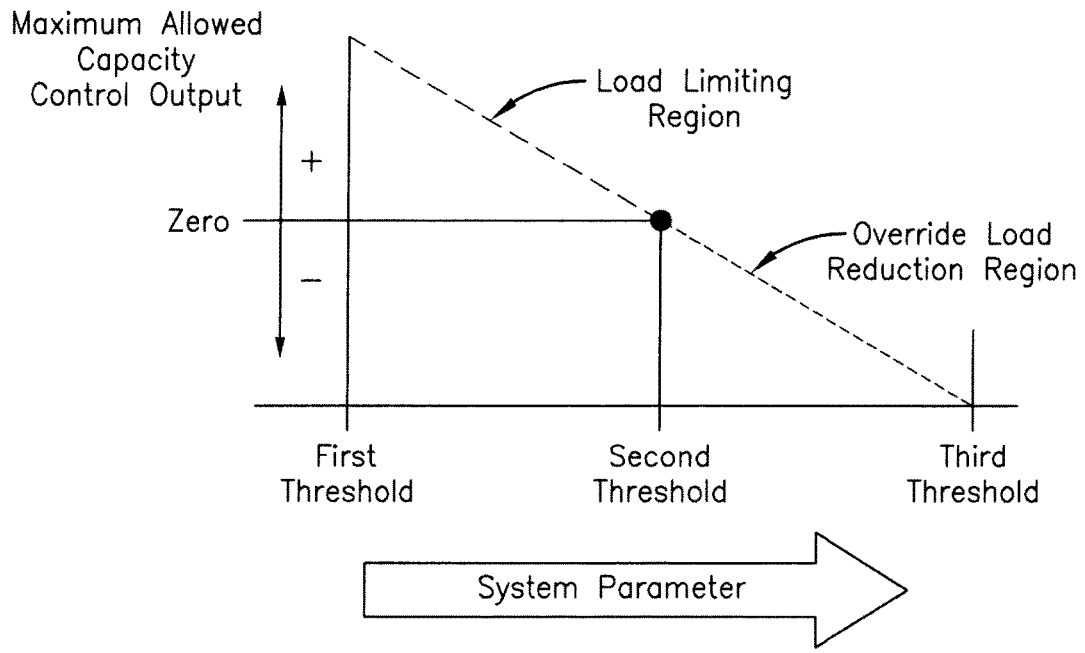
FIGS. 8-10 show exemplary embodiments of graphs identifying regions for load limiting and load reduction.
Figure 9:
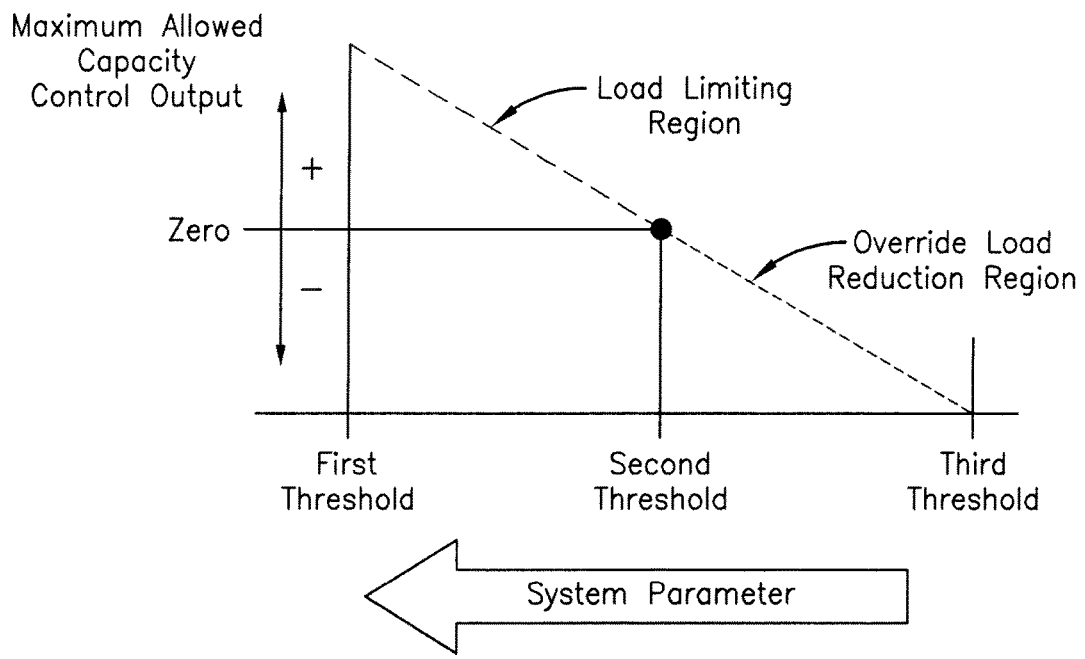

Next, the capacity control algorithm can compare measured system parameters to predetermined thresholds to determine output limiters and/or overrides (step 304). The system parameters with output limiters and overrides can include high condenser pressure limit and override, low evaporator pressure limit and override, motor current limit and override, and input current to the VSD limit and override. FIGS. 8 and 9 show graphs of the corresponding limit and override regions along with the corresponding capacity change for the condenser pressure, the evaporator pressure, the motor current, and the VSD input current.

Figure 10:
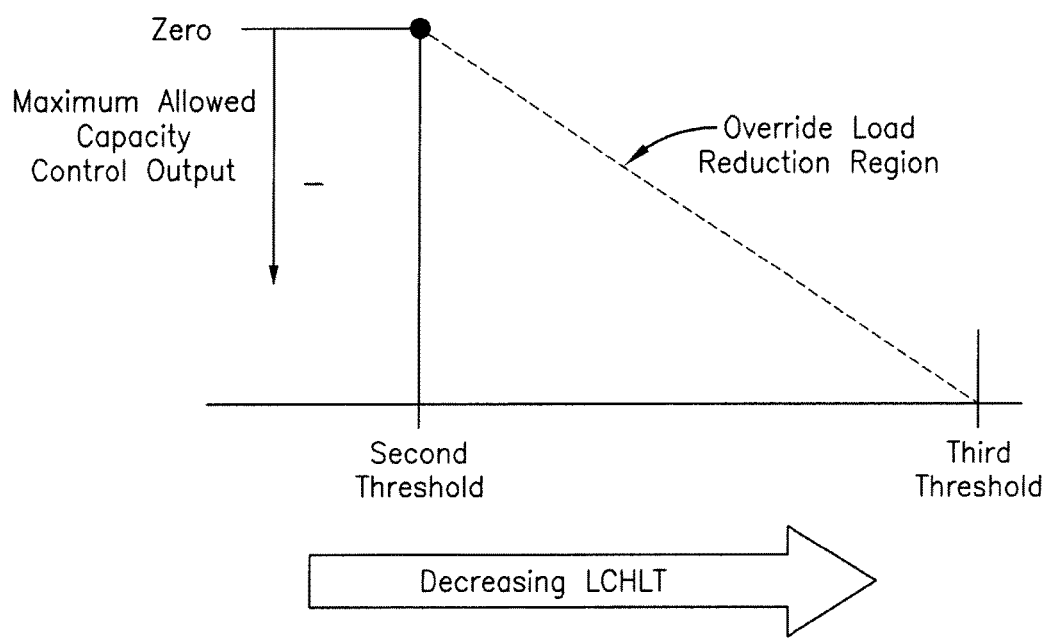

For the condenser pressure, the motor current, and the VSD input current, the graph in FIG. 8 shows for an increasing system parameter, a load limiting region between the first threshold and the second threshold and an override region between the second threshold and a third threshold. For the evaporator pressure, the graph in FIG. 9 shows for decreasing evaporator pressure, a load limiting region between the first threshold and the second threshold and an override region between the second threshold and the third threshold. In one embodiment, the first threshold, second threshold and third threshold can be preselected values based on the corresponding system parameter. In another embodiment, the second threshold can be a preselected value based on the corresponding system parameter and the first and third thresholds can be derived from the second threshold, i.e., the first threshold can be the second threshold plus or minus a preselected value and the third threshold can be the second threshold plus or minus a preselected value. In addition, the leaving chilled liquid temperature (LCHLT) can also have a low temperature override control. The graph in FIG. 10 shows for a decreasing LCHLT, an override region between the second threshold and the third threshold.

In one exemplary embodiment, the second threshold for the condenser pressure can range between 44.9 PSIG to 162.5 PSIG and can be 162.5 PSIG. The second threshold for the evaporator pressure can be 27 PSIG when water is the process fluid and the second threshold can be programmed by an operator when the process fluid is a brine. The second threshold for the motor current can be 100% full load amperage (FLA) as selected from the highest of the three phrase motor currents or maximum motor current as determined from the motor and VSD. In one embodiment, 100% FLA can be 505 A. The second threshold for the VSD input current can be the active input current limit, which corresponds to the minimum of the local input current limit, the remote input current limit and the pulldown current limit, as selected from the highest of the three phrase motor currents. The second threshold for the LCHLT can be the LCHLT shutdown temperature+2° F. The maximum value for the second threshold can be 1° F. below the LCHLT setpoint.

If the measured system parameter is in the load limiting region, the capacity control program can still increase the capacity of the system, but the amount or percentage of the increase is limited to a predetermined value(s) or amount(s) established for that system parameter. For example, there can be one predetermined value for the load limiting region or there can be a range of predetermined values for the load limiting range in which the predetermined value is determined based on the measured value for the system parameter. In one exemplary embodiment, the predetermined amount or percentage of capacity increase can range between 0.01 to 5.0 and can be 0.50. If the measured system parameter is in the override region, the capacity control program is forced to decrease the capacity of the system even if the capacity control program requires an increase in capacity. The amount or percentage of the decrease is limited to a predetermined amount(s) or value(s) established for that system parameter. For example, there can be one predetermined value for the override range or there can be a range of predetermined values for the override range in which the predetermined value is determined based on the measured value for the system parameter. In one exemplary embodiment, the predetermined amount or percentage of capacity decrease can range between −5.0 to −0.01 and can be −0.10. With regard to the percentage or amount of system capacity increase or decrease, positive numbers reflect a request for increasing capacity and negative numbers reflect a request for decreasing capacity.

Once the measured parameters are compared to the threshold values for the load limiting region and the override region, a determination is made as to whether any of the measured parameters are within the load limiting region or the override region (step 306). If one or more of the measured parameters are within the load limiting region or the override region, then an adjustment is made to the CC Output based on the determined output limiters and/or overrides (step 308). In one embodiment, the CC Output can be adjusted to an increase of the minimum of the calculated capacity change from the LCHLT PID and each of the load limiter and override values that was determined. Similarly, the CC Output can be adjusted to a decrease of the maximum of the calculated capacity change from the LCHLT PID and each of the load limiter and override values that was determined.

After the CC Output is adjusted based on any determined output limiters and/or overrides or if no output limiters and/or overrrides were determined, a minimum VSD frequency can be determined (step 310). The minimum VSD frequency can be the lower of the minimum operational system speed or the anti-surge minimum frequency. The minimum limit for VSD frequency can be used to maintain sufficient compressor lift (pressure rise) or head pressure to overcome condenser pressure and prevent surge during operation. The anti-surge minimum frequency can be calculated each cycle of the capacity control algorithm or routine using Equation 1.

$$\text{anti-surge minimum frequency} = \text{surge frequency} * \text{min frequency multiplier} * \text{min frequency multiplier 2} + \text{min frequency offset} \quad (1)$$

where:
  surge frequency is determined from Omega and VGD position during operation.

$\text{Omega} = \text{isentropic head}/(\text{speed of sound})^2$ speed of sound is determined from evaporator pressure, based on the refrigerant used in system, e.g., R134a.
  isentropic head is determined from evaporator pressure and condenser pressure, based on the refrigerant used in system, e.g., R134a.
  the min frequency multiplier, min frequency multiplier 2 and min frequency offset are values used to ensure an appropriate margin to the calculated anti-surge minimum frequency to account for instrument and system variations.

In another exemplary embodiment, the capacity control algorithm can use a built-in map based on the specific compressor size used in the system to determine the minimum VSD frequency. The map has two axes—VGD position and compressor head (calculated as the parameter Omega). VGD position can be measured electrically and compressor head can be measured using condenser pressure and evaporator pressure. The speed of sound, required in the determination of Omega, is calculated from compressor suction temperature (or evaporator saturation temperature based on evaporator pressure). The map can indicate, for a given VGD position and Omega, what the minimum VSD speed should be to assure stable and efficient operation of the compressor (i.e., avoiding surge). In another embodiment, the map can be adjusted so that the minimum VSD speed would assure avoidance of stall, a more conservative approach that sets the compressor minimum speed higher than required for avoidance of surge.

In a further exemplary embodiment, adaptive capacity control can be used in place of the built-in map. Adaptive capacity control requires detecting when stall or surge occurs using, for example, a reduction in the pressure difference between evaporator and condenser to indicate surge or "noise" in a particular frequency band in the signal from a discharge pressure sensor to indicate stall. The control can cause the VGD position to change in a probing fashion to find and record the operating limits for VSD speed and VGD position for a given compressor operating condition (head or Omega) and thereby generate the map described, so it does not have to be pre-programmed.

Additionally, in an exemplary embodiment, the capacity control algorithm calculates an additional increase to the anti-surge minimum frequency during system head increase transient events, e.g., a pulldown operation (lowering the LCHCT from ambient conditions to the LCHLT setpoint). The rate of change of Omega is monitored and the capacity control algorithm applies a proportional temporary offset when Omega is changing rapidly. The application of a proportional temporary offset prevents the driveline speed increase from lagging the speed required due to sensing and processing time.

In one embodiment, the anti-surge minimum frequency can be immediately increased as required. Compressor speed is continuously increased as necessary to prevent operation below the anti-surge minimum frequency, regardless of whether a capacity increase or decrease is otherwise required. Operating at the anti-surge minimum frequency can result in additional capacity, but the capacity control algorithm logic can respond to the LCHLT and override controls and operate the other control devices as needed to maintain setpoint or compliance with limits.

In another embodiment, the anti-surge minimum frequency can be decreased or ramped to a new lower calculated anti-surge minimum frequency. Two separate programmable ramp rates apply, depending whether the HGBV (if present) is fully closed or not. When the anti-surge minimum frequency is reduced, additional opportunities exist to reduce speed. When reducing the anti-surge minimum frequency, the VSD speed can be: 1) decreased into the additional operating band if the capacity control logic calls for unloading; 2) held constant if the LCHLT setpoint is met or satisfied or if loading is required and the loading requirement can be met or satisfied by closing the HGBV or opening the VGD; or 3) increased, as necessary, if loading is required and the other control devices have been positioned to their limits.

Once the anti-surge minimum frequency is calculated, a determination is made as to whether the calculated anti-surge minimum frequency is greater than the operational frequency determined by the capacity control program (step 312). If the anti-surge minimum frequency is greater than the operational frequency determined by the capacity control program, then an adjustment is made to the CC Output based on the anti-surge minimum frequency (step 314). After the CC Output is adjusted based on the calculated anti-surge minimum or if the anti-surge minimum frequency is less than the operational frequency determined by the capacity control program, the adjusted CC output is applied to the compressor (step 316). After the CC output is applied to the compressor, the process restarts with the next control cycle.

In one exemplary embodiment, the resulting CC Output parameter is directed to as many of the control devices (VSD, VGD, or HGBV) as necessary to effect the full desired change in the appropriate order for loading (capacity increase) and unloading (capacity decrease). The sequence of operation for the control devices in response to the CC Output parameter requiring a capacity increase can be: 1) move or adjust the HGBV (if present) toward the closed position; 2) when the HGBV is fully closed, move or adjust the VGD toward the open position; and 3) when the VGD is fully open, increase the VSD speed. The sequence of operation for the control devices in response to the CC Output parameter requiring a capacity decrease can be: 1) decrease the VSD speed; 2) when the VSD speed is at a minimum limit, move or adjust the VGD toward the closed position; and 3) when the VGD reaches the minimum limit or is in the closed position, move or adjust the HGBV (if present) toward the open position.

In another exemplary embodiment, a desired capacity change can be implemented by applying the calculated output change (CC Output) to each device necessary per a predetermined sequence so the summation of the changes to each device equals the full change desired. If the full magnitude of a change cannot be applied to a specific device due to a limit, the remainder of the change is applied to the other devices in order. Each device has an associated operating gain (selectable as its Output Gain setpoint) that relates a desired percent change in capacity to the device's response in percent position or Hertz. The magnitude of change can be determined for each of the devices according to their individual output gains. Additionally, the capacity control algorithm can account for the capacity increase due to any simultaneous speed increase caused by the anti-surge control when determining the remaining net output to apply to the control devices. For example, if the desired capacity increase is 10% and the speed has increased due to the anti-surge control in an amount that equals or corresponds to a 6% capacity increase (as determined from the VSD gain), the VGD and/or the HGBV, if present, would react only enough to effect the remaining 4% capacity increase.

In one embodiment, the VGD can be adjusted by sending current through an open or close winding in the actuator. The actuator is given a constant command until the feedback signal equals the command signal. In order to reduce dithering, once the position reaches the command position, the open and close signals cease (Hold). In order to reposition the device, a threshold magnitude of change must be requested by the control.

In one exemplary embodiment, for two-stage centrifugal compressors, the low stage VGD will be used for capacity control as its primary function and stall/surge control as its secondary function, the same as a single stage machine. The high stage VGD can be independently used only for stall/surge control for the high stage impeller.

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any machine-readable media for accomplishing its operations. The embodiments of the present application may be implemented using existing computer processors, or by a special purpose computer processor for an appropriate system, or by a hardwired system.

Embodiments within the scope of the present application include program products comprising machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

It is important to note that the construction and arrangement of the present application as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter described in the application. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims.

Furthermore, in an effort to provide a concise description of the exemplary embodiments, all features of an actual implementation may not have been described (i.e., those unrelated to the presently contemplated best mode of carrying out the invention, or those unrelated to enabling the invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A method of controlling capacity in a compressor comprising:
    calculating an output capacity parameter with a control program;
    measuring at least one system operating parameter;
    comparing the at least one measured system operating parameter to corresponding predetermined threshold values for the system operating parameter to determine whether the at least one measured system operating parameter is within a limiting region or an override region corresponding to the at least one measured system operating parameter, wherein the at least one measured system operating parameter is within the limiting region when the at least one measured system operating parameter exceeds a first threshold and does not exceed a second threshold, greater than the first threshold, and wherein the at least one measured system operating parameter is within the override region when the at least one measured system operating parameter exceeds the second threshold;
    adjusting the output capacity parameter in response to a determination that the at least one measured system operating parameter is within the limiting region or the override region;
    limiting the output capacity parameter to a predetermined amount of increase in response to the at least one measured system operating parameter being in the limiting region;
    setting the output capacity parameter to a predetermined amount of decrease in response to the at least one measured system operating parameter being in the override region;
    calculating a minimum variable speed drive frequency for the compressor to avoid surge conditions;
    comparing the calculated minimum variable speed drive frequency to a variable speed drive frequency based on the output capacity parameter;
    modifying the output capacity parameter in response to the minimum variable speed drive frequency being greater than the variable speed drive frequency based on the output capacity parameter; and
    applying the output capacity parameter to the compressor to adjust the output capacity of the compressor.

2. The method of claim 1 wherein the predetermined amount of increase is a variable amount based on the at least one measured system operating parameter and the predetermined amount of decrease is a variable amount based on the at least one measured system operating parameter.

3. The method of claim 1 wherein said calculating the minimum variable speed drive frequency includes selecting a lower of a predetermined minimum operational system frequency or an anti-surge minimum frequency.

4. The method of claim 3 wherein the anti-surge minimum frequency is calculated using isentropic head and a position of a variable geometry diffuser in the compressor.

5. The method of claim 3 wherein the anti-surge minimum frequency is adjustable during operation of the compressor.

6. The method of claim 1 wherein said applying the output capacity parameter to the compressor to adjust the output capacity of the compressor includes applying the output capacity parameter to control at least one of a variable speed drive, a variable geometry diffuser or a hot gas bypass valve.

7. The method of claim 1 wherein said measuring at least one system operating parameter includes measuring at least one of condenser pressure, evaporator pressure, motor current or input current to the variable speed drive.

8. The method of claim 1 wherein the limiting region is defined by the first threshold and the second threshold and the override region is defined by the second threshold and a third threshold, greater than the first and second thresholds.

9. The method of claim 1 wherein said calculating an output capacity parameter includes applying a proportional, integral, derivative control algorithm to determine a percent change to output capacity.

10. The method of claim 9 wherein the percent change to output capacity is determined based on a comparison of a leaving chilled liquid temperature and a leaving chilled liquid temperature setpoint.

11. A system comprising:
    a compressor, a condenser, an expansion device and an evaporator connected in a closed refrigerant circuit;
    a motor connected to the compressor to power the compressor;
    a variable speed drive connected to the motor to power the motor, the variable speed drive being operable to provide a variable voltage to the motor and a variable frequency to the motor;
    a control panel to control operation of the variable speed drive and one or more components of the system, the control panel comprising a microprocessor and a memory device;
    a sensor to measure an operational parameter of the system, the sensor being in communication with the control panel to provide the measured operational parameter; and
    the control panel being operable to:
        calculate an output capacity parameter of the compressor with a capacity control program;
        receive the measured operational parameter of the system from the sensor;
        compare the measured operational parameter to corresponding predetermined threshold values for the operational parameter to determine whether the measured operational parameter is within a limiting region or an override region corresponding to the measured operational parameter, wherein the measured operational parameter is within the limiting region when the measured operational parameter exceeds a first threshold and does not exceed a second threshold, greater than the first threshold, and wherein the measured operational parameter is within the override region when the measured operational parameter exceeds the second threshold;
        adjust the output capacity parameter in response to a determination that the measured operational parameter is within the limiting region or the override region;
        limit the output capacity parameter to a predetermined amount of increase in response to the measured operational parameter being in the limiting region;
        set the output capacity parameter to a predetermined amount of decrease in response to the measured operational parameter being in the override region;
        calculate a minimum variable speed drive frequency for the compressor to avoid surge conditions;
        compare the calculated minimum variable speed drive frequency to a variable speed drive frequency based on the output capacity parameter;
        modify the output capacity parameter in response to the minimum variable speed drive frequency being greater than the variable speed drive frequency based on the output capacity parameter; and apply the output capacity parameter to the compressor to adjust an output capacity of the compressor.

12. The system of claim 11 wherein the compressor comprises a centrifugal compressor having a variable geometry diffuser and a hot gas bypass valve.

13. The system of claim 12 wherein the control panel adjusts one or more of the variable speed drive, variable geometry diffuser or hot gas bypass valve to adjust the output capacity of the compressor.

14. The system of claim 11 wherein the minimum variable speed drive frequency maintains an amount of pressure rise in the compressor to overcome condenser pressure and prevent surge.

15. The system of claim 14 wherein the minimum variable speed drive frequency is increased and decreased during system operation.

16. The system of claim 11 wherein the sensor measures one of condenser pressure, evaporator pressure, motor current or input current to the variable speed drive.

17. The system of claim 11 wherein the capacity control program is a proportional, integral, derivative control algorithm using a comparison of a leaving chilled liquid temperature and a leaving chilled liquid temperature setpoint.

* * * * *